United States Patent
Shin et al.

(10) Patent No.: US 7,400,899 B2
(45) Date of Patent: Jul. 15, 2008

(54) METHOD FOR CONTROLLING POWER LEVEL BASED ON PACKET ERROR RATE IN WIRELESS PERSONAL AREA NETWORK SYSTEM

(75) Inventors: Cheol-Ho Shin, Daejon (KR); Chang-Joo Kim, Daejon (KR); Hyung-Soo Lee, Daejon (KR); Sangsung Choi, Daejon (KR); Il-Kyoo Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 605 days.

(21) Appl. No.: 10/895,154

(22) Filed: Jul. 19, 2004

(65) Prior Publication Data

US 2005/0097409 A1    May 5, 2005

(30) Foreign Application Priority Data

Oct. 30, 2003    (KR) ..................... 10-2003-0076319

(51) Int. Cl.
*H04B 7/00* (2006.01)

(52) U.S. Cl. .................. 455/522; 455/517; 455/69; 455/68; 455/127.1; 455/226.1; 370/332; 370/333; 370/328; 370/329; 370/338

(58) Field of Classification Search .......... 455/522, 455/517, 69, 68, 127.1, 226.1, 503; 370/332, 370/333, 328, 329
See application file for complete search history.

(56) References Cited

U.S. PATENT DOCUMENTS 6,144,861 A * 11/2000 Sundelin et al. ............ 455/522

(Continued)

FOREIGN PATENT DOCUMENTS

KR    1999-74805    10/1999

(Continued)

OTHER PUBLICATIONS

Ashwin Sampath et al., "On Setting Reverse Link Target SIR in a CDMA System", 0-7803-3659-3/97, copyright 1997 IEEE (pp. 929-933).

(Continued)

*Primary Examiner*—Rafael Perez-Gutierrez
*Assistant Examiner*—Khai Nguyen
(74) *Attorney, Agent, or Firm*—Blakely, Sokoloff, Taylor & Zafman LLP

(57) ABSTRACT

Disclosed is a method for controlling a power level based on a packet error rate (PER) in a wireless personal area network (WPAN) system. The method for controlling a power level based on a packet error rate (PER) in a wireless personal area network (WPAN) system, includes the steps of: a) at a receiver, computing a PER of a packet in an initial check duration of PER (DP) wherein a transmission power level of the packet is set by a piconet coordinator (PNC); b) at the receiver, determining whether the computed PER satisfies a target PER, adjusting a target signal-to-interference ratio (SIR) and requesting a transmitter to adjust the initial transmission power level; and c) at the receiver, determining whether the number (N) of successive G is larger than a power control threshold, wherein G denotes DP satisfying the target PER, changing the target SIR based on the determination result whether the number (N) of successive G is larger than the power control threshold, and requesting the transmitter to adjust the possible transmission power level.

10 Claims, 8 Drawing Sheets

U.S. PATENT DOCUMENTS

| | | | |
|---|---|---|---|
| 2002/0012383 A1* | 1/2002 | Higuchi et al. | 375/141 |
| 2003/0068984 A1* | 4/2003 | Shin et al. | 455/69 |
| 2005/0043052 A1* | 2/2005 | Whinnett et al. | 455/522 |
| 2006/0056356 A1* | 3/2006 | Arvelo | 370/332 |
| 2007/0218935 A1* | 9/2007 | Chi et al. | 455/522 |

FOREIGN PATENT DOCUMENTS

| | | |
|---|---|---|
| KR | 1020020006581 | 6/2001 |
| KR | 2003-54825 | 7/2003 |

OTHER PUBLICATIONS

Sang-Sung Choi et al., "Power Control and Automatic Frequency Offset Control for UWB Communications", IEEE 802.15-03/275r0, Project: IEEE P802.15 Working Group for Wireless Personal Area Networks (WPANS), Submission Slide 1-18.

* cited by examiner

| OCTET:8 | 1 | 1 | 1 | 2 | 2 | 6 |
|---|---|---|---|---|---|---|
| PNC ADDRESS | PNC RESPONSE | PICONET MODE | MAX TRANSMISSION POWER LEVEL | CAP END TIME | SUPER FRAME DURATION | TIME TOKEN |
| 41 | 42 | 43 | 44 | 45 | 46 | 47 |

METHOD FOR CONTROLLING POWER LEVEL BASED ON PACKET ERROR RATE IN WIRELESS PERSONAL AREA NETWORK SYSTEM

FIELD OF THE INVENTION

The present invention relates to a method for controlling a power level based on a packet error rate (PER) in a wireless personal area network (WPAN) system; and, more particularly, to a method for controlling a power level based on a packet error rate (PER) to secure quality of service (QoS) in a wireless personal area network (WPAN) system featuring fixed communications or low-speed mobility.

DESCRIPTION OF RELATED ART

Nowadays, it is common case that many people carry a wide variety of electronic devices with them wherever they go, for example, a notebook, a cellular phone and a personal digital assistant (PDA). Nonetheless, communication between such devices is often more problematic than it may appear to be, and the application software of one device is not compatible with those of others. A wireless personal area network (WPAN) is a technique for wirelessly interconnecting all the electronic devices that people carry with them, to thereby communicate the devices.

The WPAN is also known as an ad-hoc data communication system wherein each device communicates with other devices in close proximity, roughly 10 meters of one another.

The WPAN is a power-efficient and cost-effective as well as versatile network system that is applicable to a wide variety of electronic devices including all the usual communicating and computing devices.

The WPAN is formed when at least two such devices are wirelessly connected, which is referred to as a piconet. In which case, when a piconet is formed, one device functions as a piconet coordinator (PNC) that provides the other device(s) with a basic timing and puts measures in place to guarantee quality of service (Qos).

The need for adjusting a power level arises when a radio signal interferes with another signal on a similar wavelength. Power control need to be performed to reduce power consumption and the interference between the piconets.

FIG. 1 is a flow chart describing a conventional power control method for use in an uplink external circuit in a mobile communication system.

At step S101, it is determined whether quality-value of a received signal frame at a base station reaches the target quality-value. At step S102, target signal-to-interference ratio (SIR) is increased by one step size (Δ) if the quality-value of the received signal frame transcends the target quality-value. On the contrary, at step S103, target SIR is decreased by one step size (Δ) if the quality-value of the received signal frame turns out to be below the target quality-value. At step S104, an updated value of the target SIR is transmitted to the base station.

The conventional power control method maximizes the capability by adjusting the target SIR on a regular basis in line with the quality of a received signal frame at a base station. In other words, in the conventional mobile communication system a change in the target SIR, either an increase or a decrease, is contingent upon the existence of an error in the received signal frame at the base station.

One main drawback to the conventional power control method is that an error in causing the received signal to move towards the target SIR is the most likely outcome. This is largely due to the fact that the received signal either increases or decreases by a fixed amount, namely by one step size (Δ), irrespective of how badly damaged the received signal is.

An example solving the drawback of a conventional power control method in a communication system is disclosed in Korean Patent Application No.10-1998-0008633 entitled "A communication system based on external loop Power control method of a digital code-division multiple-access scheme."

The Korean Patent Application No.10-1998-0008633 describes a method of controlling the power level of a transmitted signal in the event of a frequent occurrence of frame loss. In which method, a predetermined amount of increment is multiplied by the number of frame losses and then is weighted to work out the amount by which the signal-to-noise ratio (Eb/No) either increases or decreases. The conventional power control method described in the Korean Patent Application No.10-1998-0008633 is proven effective in safeguarding against a call disconnection. However, the conventional power control method is limited to some conditions in which channel environment is abruptly changed and is not applicable to the WPAN system. In detail, large power consumption is the most likely cost if this power control method is to be implemented in the WPAN system. This ruins an otherwise versatile and effective method of controlling power in a communication system.

Proposed in an article by Sampath, entitled "On setting reverse link target SIR in a CDMA system," VTC, pp. 929-933, May 1997 is a list of power control methods for use in an uplink external circuit, each of which is tailored to suit the needs of each user, in this case adjusting the target SIR to meet a corresponding frame error rate (FER). Referring to FIG. 2, the power level is adjusted so that the FER becomes 0.01 in an ideal condition. For example, in the event of an error occurrence in the k-1$^{th}$ frame, the target SIR value of the k$^{th}$ frame is increased by k×Δ to acquire k frames. On the contrary, the target SIR value is decreased by Δ with every time step. Assuming that the FER is 0.01, the value of K becomes roughly 99. One of the major drawbacks to the method discussed in the preceding section is that the target SIR can be overshoot owing to the fact of not factoring in the occurrence of frame error.

A conventional power control method for use in an uplink external circuit in a wireless communication system is in the Korean Patent application No.10-2001-0085239 which is intent on getting around the above-mentioned problems. In which method, the result is weighted to account for a deviation of the FER from the norm. In turn, the extent to which the FER deviates from the norm is factored into working out the up-signal-to-interference ratio (Up-SIR). Likewise, in a series of frames the cumulative effect is taken into account in the outcome. In which case, the target SIR is decreased by the down-signal-to-interference ratio (Down-SIR), resulting in which a received signal moves towards the target SIR faster than it does in the prior art. However, as is in the Korean Patent Application No.10-1998-0008633, the conventional power control method described in the Korean Patent Application No.10-2001-0085239 is neither effective nor applicable to the WPAN system largely due to its large power consumption.

The standardization of the WPAN is still in progress and the details of any relevant power control method are as yet established. For this reason, an articulate and detailed power control method specifically designed for use in the WPAN system is much needed.

SUMMARY OF THE INVENTION

It is, therefore, an object of the present invention to provide a method for controlling a power level based on a packet error rate (PER) in a wireless personal area network (WPAN) system; and, more particularly, a method for controlling a power level based on a packet error rate (PER) to secure quality of service (Qos) in a wireless personal area network (WPAN) system featuring fixed telecommunications and low-speed mobility.

In accordance with an aspect of the present invention, there is provided a method for controlling a power level based on a packet error rate (PER) in a wireless personal area network (WPAN) system, the method including the steps of: a) at a receiver, computing a PER of a packet in an initial check duration of PER (DP) wherein a transmission power level of the packet is set by a piconet coordinator (PNC); b) at the receiver, determining whether the computed PER satisfies a target PER, adjusting a target signal-to-interference ratio (SIR) and requesting a transmitter to adjust the initial transmission power level; and c) at the receiver, determining whether the number (N) of successive G is larger than a power control threshold, wherein G denotes DP satisfying the target PER, changing the target SIR based on the determination result whether the number (N) of successive G is larger than the power control threshold, and requesting the transmitter to adjust the possible transmission power level.

In accordance with another aspect of the present invention, there is provided a method for controlling a power level based on a packet error rate (PER) in a wireless personal area network (WPAN) system, the method including the steps of: a) at a transmitter, transmitting a packet in a check duration of the PER (DP), wherein a transmission power level is set by a piconet coordinator (PNC), and then computing the PER based on an immediate response (immediate Ack); b) at the transmitter, determining whether the computed PER of the packet satisfies a target PER, and adjusting the transmission power level, and setting an initial transmission power level; and c) at the transmitter, determining whether the number (N) of successive G is larger than a power control threshold (M), wherein G denotes DP satisfying the target PER, adjusting the transmission power level based on the determination result whether the number (N) of successive G is larger than a power control threshold (M), and optimizing the transmission power level.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
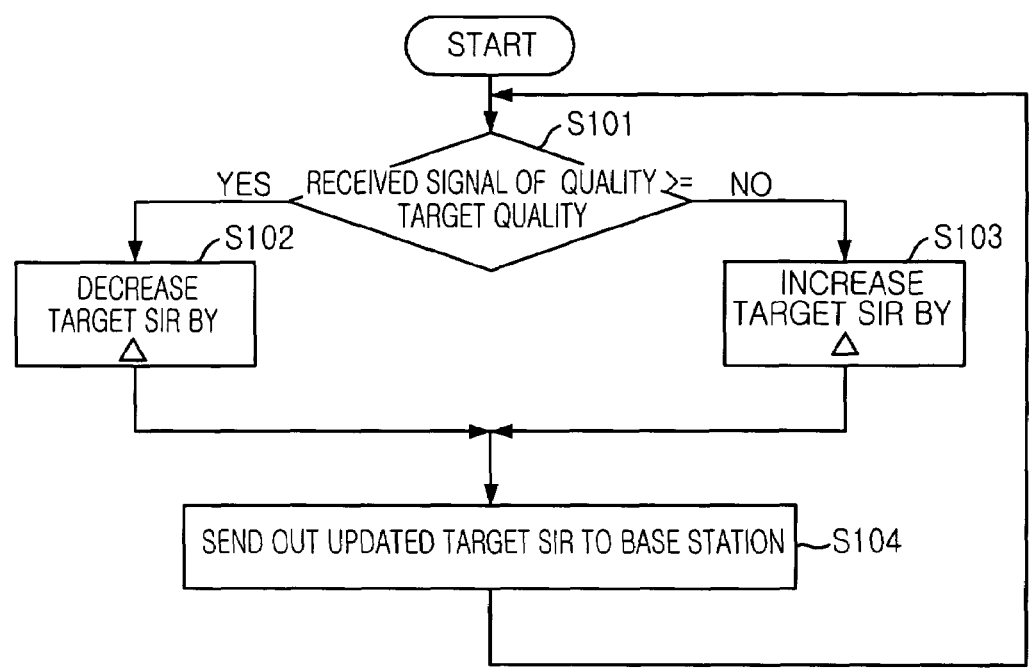
FIG. 1 is a flow chart describing a conventional power control method for use in an uplink external circuit in a mobile communication system.
Figure 2:
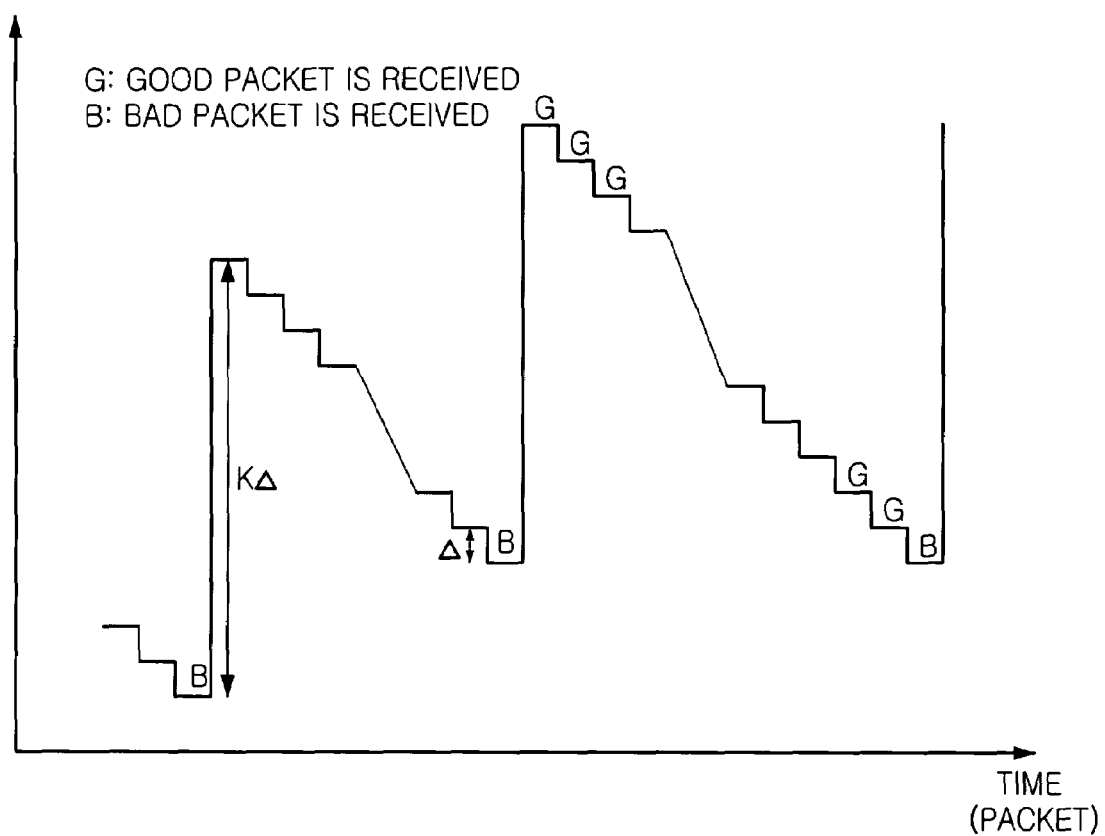
FIG. 2 is a graph illustrating a conventional power control method for use in an external circuit in a mobile communication system.
Figures 3, 4:
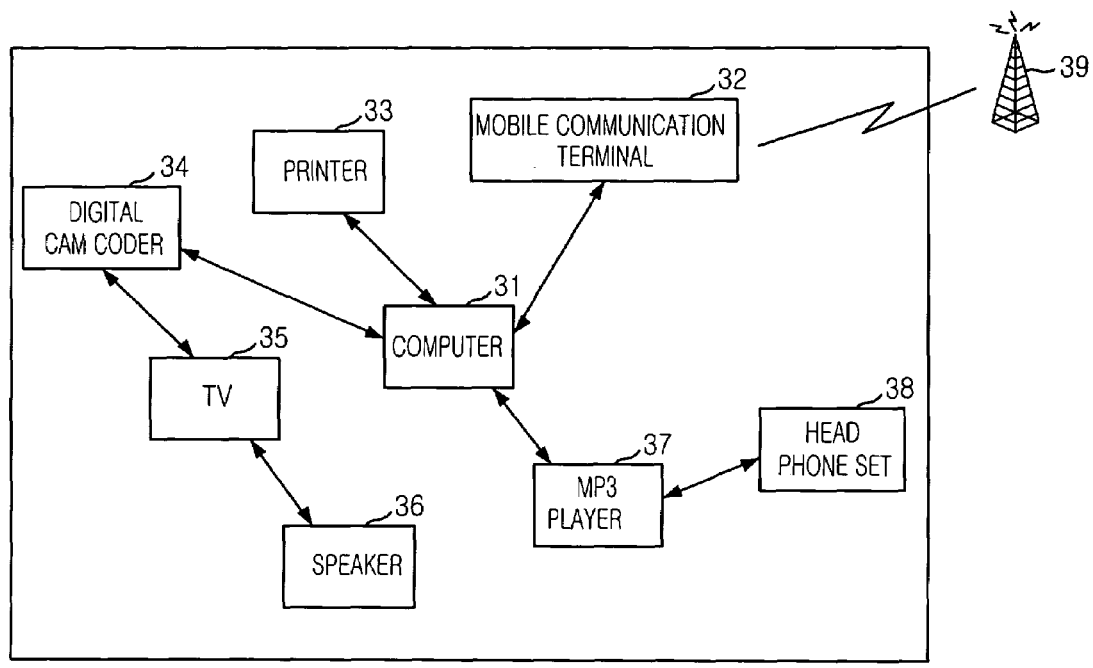
FIG. 3 is a diagram showing a wireless personal area network (WPAN) in accordance with an embodiment of the present invention.
FIG. 4 is a diagram showing a beacon frame in accordance with an embodiment of the present invention.

FIG. 3 is a diagram showing a wireless personal area network (WPAN) in accordance with an embodiment of the present invention.

As shown, the WPAN includes a computer 31, a mobile communication terminal 32, a printer 33, a digital camcorder 34, a television 35, a speaker 36, a MP3 player 37 and a headphone set 38. An ad-hoc network is formed when all the above-mentioned devices interconnect. Most recently, home appliances and portable communication devices are designed to support WPAN such that each device can communicate with other devices within its close proximity. A piconet is formed when at least two devices in close proximity to each other wirelessly are connected. In which case, information is shared among such devices. An access point (AP) 39 functions as the gateway to the Internet.

FIG. 4 is a diagram showing a beacon-frame in accordance with an embodiment of the present invention.

A standard IEEE802.15.3 is a network to which the present invention is applicable. The IEEE802.15.3 is not an AP-based network but is more like an ad-hoc network. The standard IEEE802.15.3 employs a time division multiple access (TDMA) scheme as a media access control (MAC) scheme. A super frame is a temporal layout structure in which another MAC frame is embedded. The super frame includes a beacon, a content access period (CAP) and a channel time allocation period (CTAP). The beacon contains control information. The CAP is used for controlling random access. The CTAP is used for collecting data.

Referring to FIG. 4, the beacon-frame contains a piconet coordinator (PNC) address field 41, a PNC response field 42, a piconet mode field 43, a maximum transmission power level (Max TX power level) field 44, a contention access period (CAP) end time field 45, a super frame duration field 46 and a time token field 47. The PNC chooses a maximum transmission power level on the basis of information contained in the Max TX power level field 44. In which case, the size of the piconet is factored into the selection of the maximum transmission power level. The maximum transmission power level is then passed onto each device in the piconet.

Figure 5:
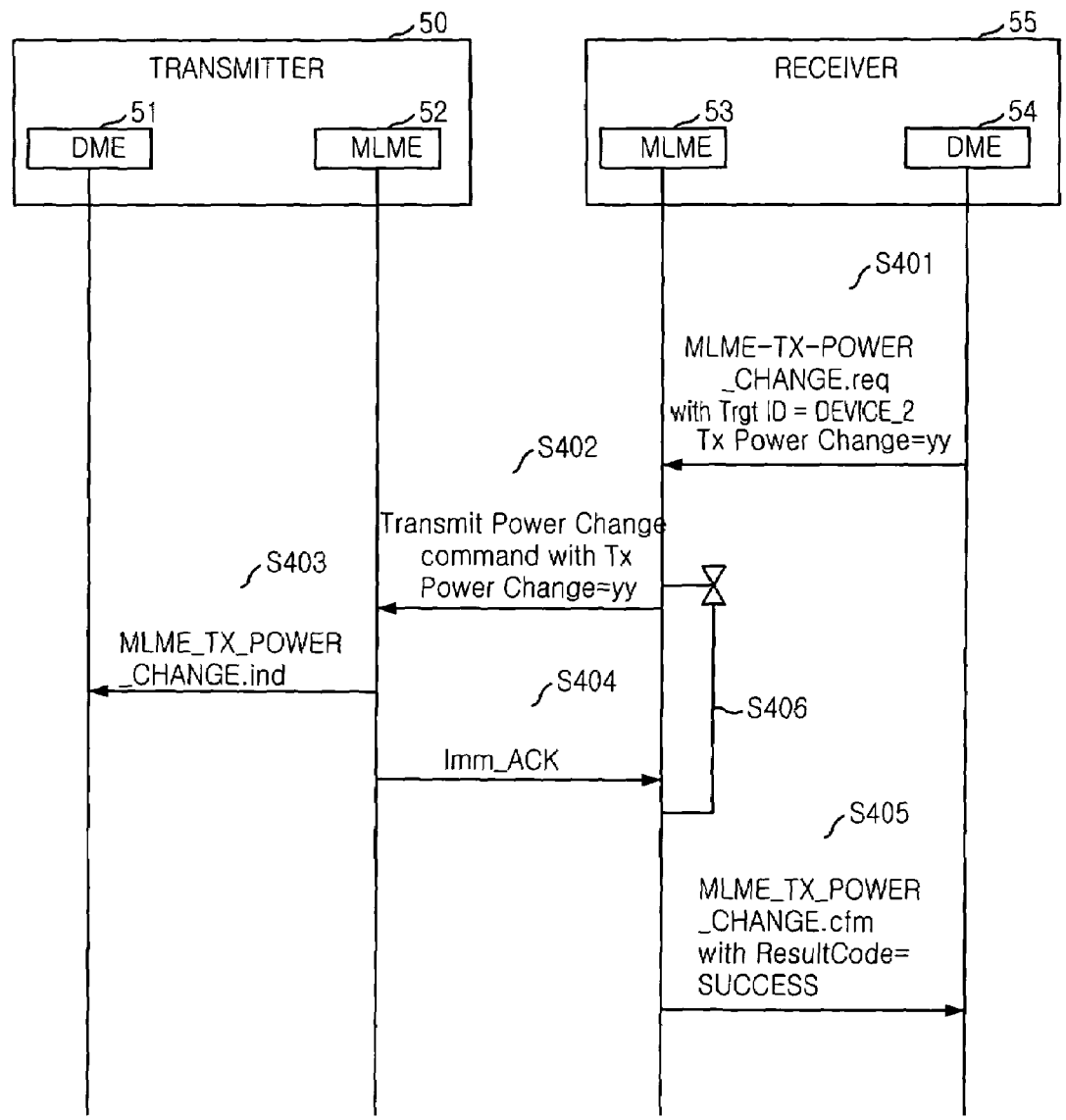
FIG. 5 is a flow chart describing a method for controlling a power level at the request of a device in the WPAN system, as is in IEEE802.15.3.

FIG. 5 is a flow chart describing a method for controlling a power level at the request of a device in the WPAN system in accordance with IEEE802.15.3.

As shown, those devices involved in the channel time allocation (CTA) can make a request that the transmission power level be either elevated or lowered in the WPAN system. In this case, such channel time allocation (CTA) is encapsulated in the MAC scheme employed in the IEEE802.15.3.

At step S401, a device management entity (DME) 54 of a receiver 55 sends out a MLME-TX-POWER-CHANGE.req to a MAC Layer Management Entity (MLME) 53 of the receiver 55. The MLME-TX-POWER-CHANGE.req is a message for a request for a change in the transmission power level. At step S402, the MLME 53 gives a transmission power change command to a MLME 52 of a transmitter 50. At step S403, the MLME 52 gives a MLME-TX-POWER-CHANGE.ind to a DME 51 located in the transmitter. The MLME-TX-POWER-CHANGE.ind is a message for an indication of a change in the transmission power level. Next, the MLME 52 replies to its counterpart MLME 53 in the receiver 55 by sending a confirmation of a change in the transmission power level (Imm_ACK). At step S405, the MLME 53 sends a confirmation of a change in the transmission power level (MLME-TX-POWER-CHANGE.cfm) to the DME 54. The steps S402 and S404 should be carried out within a transmission power change time out 406.

On the other hand, the MAC scheme employed in the IEEE802.15.3 includes another power control method wherein each device adjusts its own power level based on its self-assessment (which is referred to as "a power control method based on Ack. policy").

Figure 6:
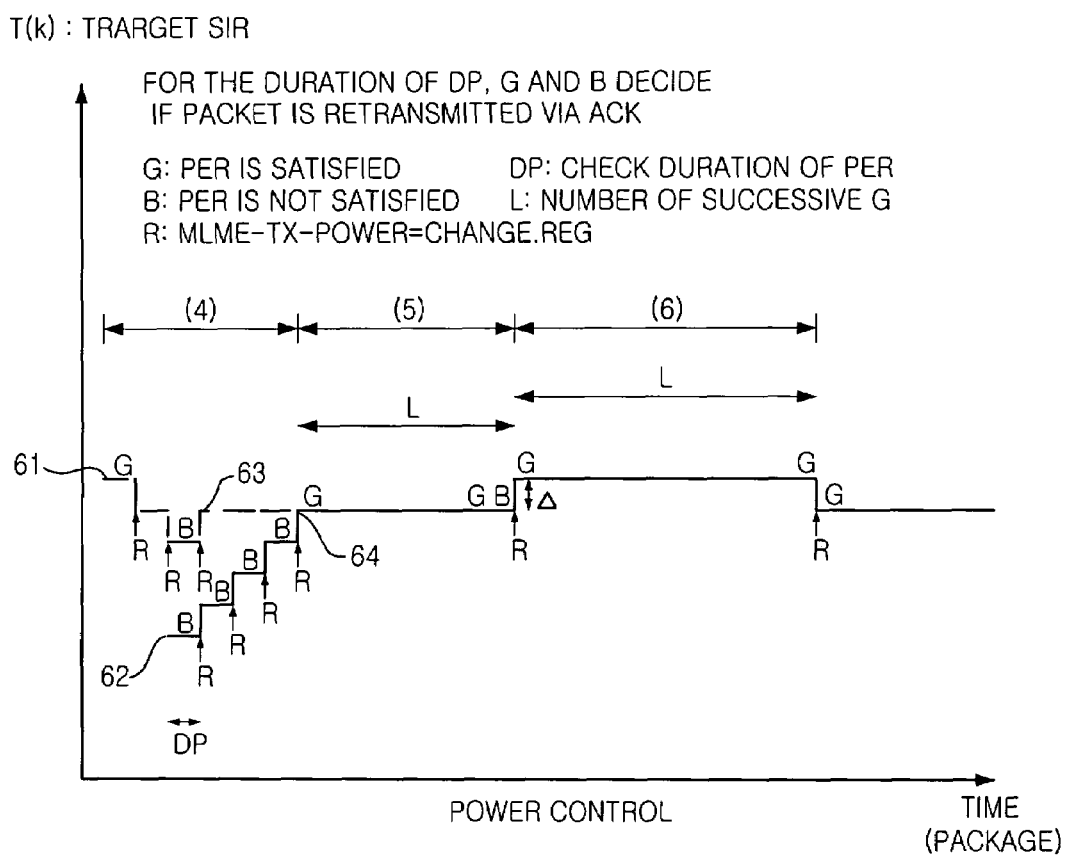
FIG. 6 is a graph illustrating a method for adjusting a power level, based on a so-called 'No Ack policy', based on a packet error rate (PER) in a WPAN system in accordance with an embodiment of the present invention.

FIG. 6 is a graph illustrating a method for adjusting a power level, based on a so-called 'No Ack. policy', based on a PER in a WPAN system in accordance with an embodiment of the present invention. The 'No Ack. policy' is a procedure in which the transmitter doesn't reply to the receiver by sending a confirmation of a change in the transmission power level.

Referring to FIG. 6, a method for adjusting a power level based on a PER in a WPAN system can be classified into an initial target SIR set-up process and a process of optimizing a target SIR to account for a change in a network environment. As for the initial target SIR set-up process, the PNC decides on an initial transmission power. In which case, the receiver computes the PER at regular intervals defined by a 'check duration of PER (DP)' so as to determine whether the target SIR is met. The DP is the number of packets necessary for working out the PER. The DP is preferably greater than $$\frac{1}{\text{target } PER} - 1.$$

A point labeled 'G' represents a condition in which the DP meets the target PER; and 'B', a condition in which the DP falls short of the target PER.

For example, in the event of the initial DP meeting the target PER (at the point labeled 61), the receiver 55 is thought that an initial target SIR value is higher than usual, and decreases the target SIR value by one step size (Δ). The receiver 55, in turn, sends out a MLME-TX-POWER-CHANGE.req to the transmitter 50 in order that the power level of the transmitter 50 is lowered. The above-mentioned process repeats itself until the PER of the DP falls to satisfy the target SIR. If the DP fails to satisfy the target SIR, the target SIR is increased by one step size (Δ). In this case, the receiver 55 sends out a MLME-TX-POWER-CHANGE.req to the transmitter 50 in order to increase the transmission power level of the transmitter 50. The target SIR value at this point becomes a new initial target SIR.

If the PER of the DP fails to satisfy the target PER (at the point labeled 62), a receiver 55 is thought that an initial target SIR is lower than usual, and increases the target SIR value by one step size (Δ). In which case, the receiver 55 sends out a MLME-TX-POWER-CHANGE.req to the transmitter 50 in order to increase the power level of the transmitter 50. The above-mentioned process repeats itself until the PER of the DP satisfies the target SIR (at the point labeled 64). Now, the target SIR at this point becomes a new initial target SIR.

After setting the initial target SIR, channel/interference environment does not change often owing to a characteristic of the WPAN. Therefore, it is not preferred to frequently adjust the target SIR value just to factor in a minute environmental change. Following from the above, maintaining an optimal target SIR is done by keeping the target SIR constant unless the number of B transcends a certain threshold wherein B denotes DP failing to satisfy the target SIR. The detailed description of the relevant operation is given below in conjunction with FIG. 7.

Figure 7:
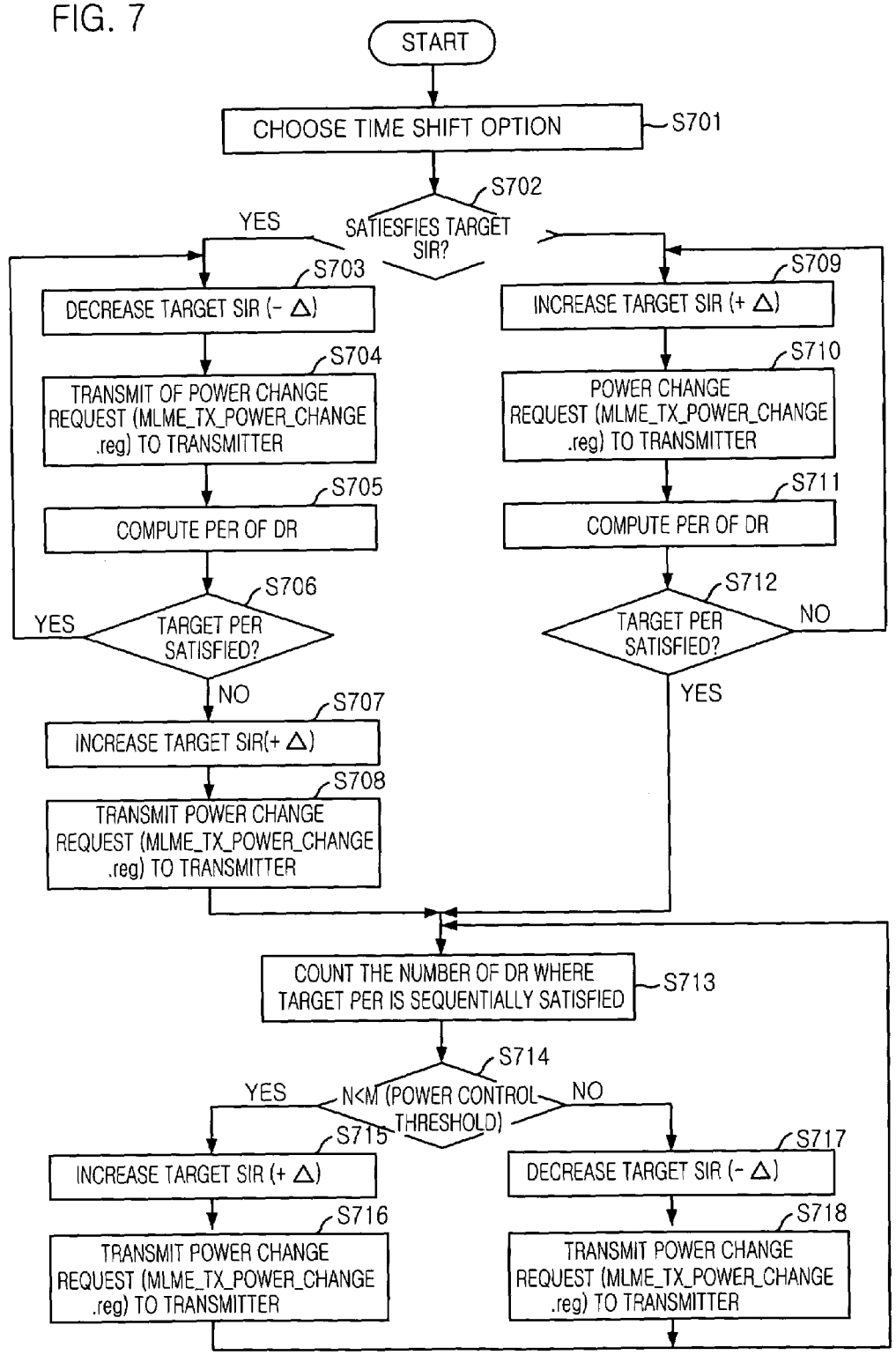
FIG. 7 is a flow chart illustrating a method for adjusting a power level, based on a 'No Ack policy', based on a PER in a WPAN system in accordance with an embodiment of the present invention.

FIG. 7 is a flow chart illustrating a method for adjusting a power level, based on a 'No Ack' policy, based on a PER in a WPAN system in accordance with an embodiment of the present invention.

At step S701, a receiver 55 computes a PER upon receiving packets in an initial DP packet that is transmitted based on a transmission power level decided on by a piconet controller (PNC). At step S702, it is determined whether the PER of the initial DP satisfies a target PER. The target SIR is gradually decreased by a predetermined value until the PER of the initial DP falls to satisfy the target PER, and an initial target SIR is set (Steps 703 to 708).

In detail, at step S703, the target SIR is decreased by a predetermined value, e.g., one step size (Δ) if the PER of the initial DP satisfies the target PER. At step S704, the receiver 55 sends out a MLME-TX-POWER-CHANGE.req to the transmitter 53 requesting to decrease the transmission power level of the transmitter. At step S705, the PER of the received packet in the DP is computed. At step S706, it is determined whether the computed PER satisfies the target PER. The process repeats steps S703 to S706 until the computed PER fails to satisfy the target PER.

At step S707, the target SIR is increased by one step size (Δ). At step S708, the receiver 55 sends out a MLME-TX-POWER-CHANGE.req to the transmitter 50 to increase its power level, and the new initial target SIR is set.

On the other hand, the target SIR is gradually increased by the predetermined value until the PER of the initial DP satisfies the target PER, and an initial target SIR is set (Steps 709 to 712).

In detail, at step 709, the target SIR is increased by one step size (Δ) if the PER of the initial DP fails to satisfy the target PER. At step S710, the receiver 55 sends out a MLME-TX-POWER-CHANGE.req to the transmitter 50 to increase its power level. At step S711, the PER of the DP is computed. At step S712, it is determined whether the computed PER satisfies the target PER. If the computed PER does not satisfy the target PER, the process repeats the steps S709 to S712 until the computed PER satisfies the target PER. If the computed PER satisfies the target PER, the current target SIR value becomes a new initial target SIR value.

From step S713 onwards, the process of optimizing the target SIR value is described in detail. In which case, any environmental change is factored in so as to maintain the best possible value of the target SIR.

At step S713, the number of successive G is counted wherein G denotes DP satisfying the target PER. At step S714, it is determined whether the number (N) of successive G transcends a certain power control threshold (M). At step S715, the current value of the target SIR is increased by one step size (Δ) if the number of successive G (N) is smaller than the power control threshold (M). At step S716, the receiver sends out a MLME-TX-POWER-CHANGE.req to the transmitter to increase its power level. From this step onwards, the process repeats the steps S713 to S716.

On the other hand, at step S717, the current value of the target SIR is decreased by one step size (Δ) if the number (N) of successive G is equal to or larger than the power control threshold (M). At step S718, the receiver sends out a MLME-TX-POWER-CHANGE.req to the transmitter to decrease its the power level. From this step onwards, a sequence of steps from S713 to S718 repeats itself.

Until now, the process of setting the target SIR based on a 'No Ack policy' is described. The detailed description of the process of setting the target SIR, based on a so-called 'Immediate Ack policy' will be described in conjunction with FIG. 8 and FIG. 9.

'No Ack policy' is a procedure in which a transmitter doesn't reply to a receiver by sending a confirmation of a change in the transmission power level. Referring to FIG. 5, the target SIR set-up process based on the 'No Ack policy' makes use of the fact that whether or not the receiver 55 receives a packet can be deduced from confirmation of receipt of the immediate response. In other words, the transmitter 50 computes the PER based on the immediate response in its possession. In which case, the transmitter 50 does not have to wait around for the receiver 55 to make a request, MLME-TX-POWER-CHANGE.req. Here, MLME-TX-POWER-CHANGE.req stands for a request for a change in the transmission power level. The transmitter 50 adjusts its power level.

Figure 8:
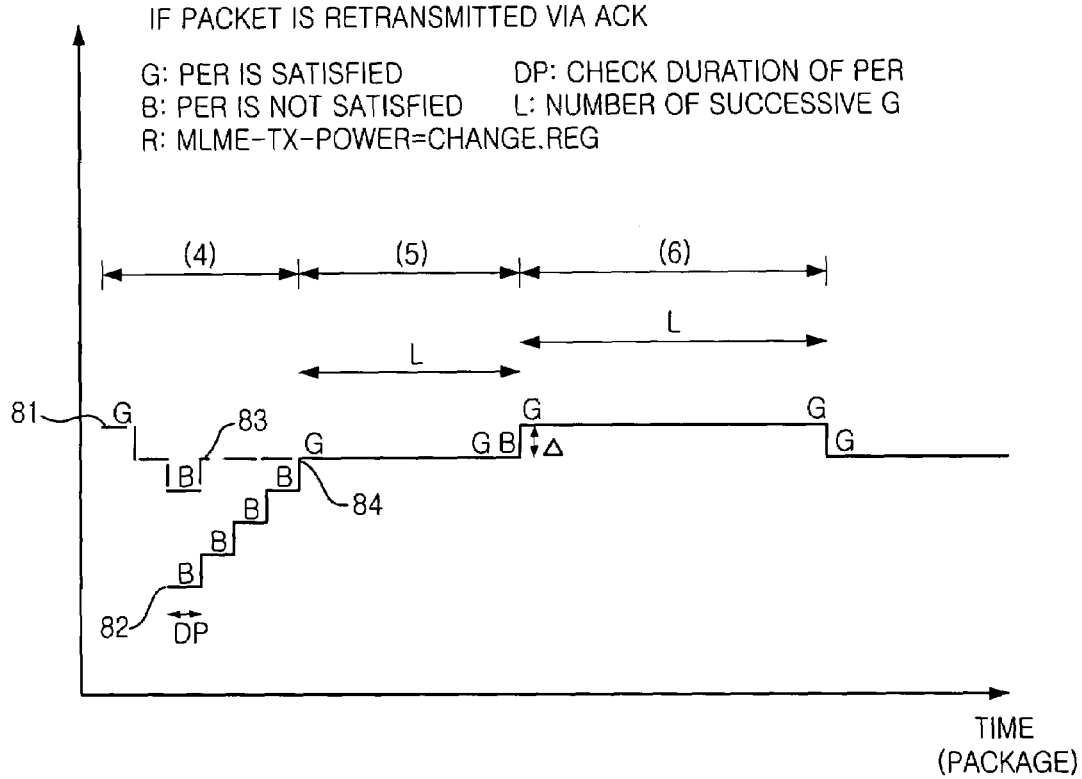
FIG. 8 is a graph illustrating a method for adjusting a power level, based on an 'Immediate Ack policy', based on a PER in a WPAN system in accordance with an embodiment of the present invention.

FIG. 8 is a graph illustrating a method for adjusting a power level, according to an 'Immediate Ack policy', based on a PER in a WPAN system in accordance with an embodiment of the present invention.

As shown, as for the power control method based on the 'Immediate Ack policy', what makes this method unique lies in that the transmitter 50 adjusts its own power level based on its channel estimation.

The transmitter 50 sends out a packet based on the initial transmission power level. In which case, the initial transmission power level is set by the PNC. The transmitter 50 computes the PER based on the immediate response to the transmitted packet and then determines whether the computed PER satisfies the target PER.

Following from the above, in a case that the PER of the initial DP satisfies the target PER (at the point labeled 81), the transmission power level is decreased by one step size (Δ). The decrease of the transmission power level is repeated until the PER of the DP does not satisfy the target PER (at the point labeled 83). A point labeled 'G' represents a condition in which the PER of the DP satisfies the target PER; and 'B' a condition in which the PER of the DP falls to satisfy the target PER. If the PER of the DP satisfies the target PER (G) and then falls to satisfy the target PER, the transmission power level is increased by one step size (Δ). The increased power level is set as an initial transmission power level.

If the PER of the DP fails to satisfy the target PER, the transmission power level is thought to be lower than usual, and the transmission power level is increased by one step size (Δ). This process repeats itself until the PER of the DP satisfies the target PER (at the point labeled 84). The resultant transmission power level at this point becomes the new initial transmission power level.

Figure 9:
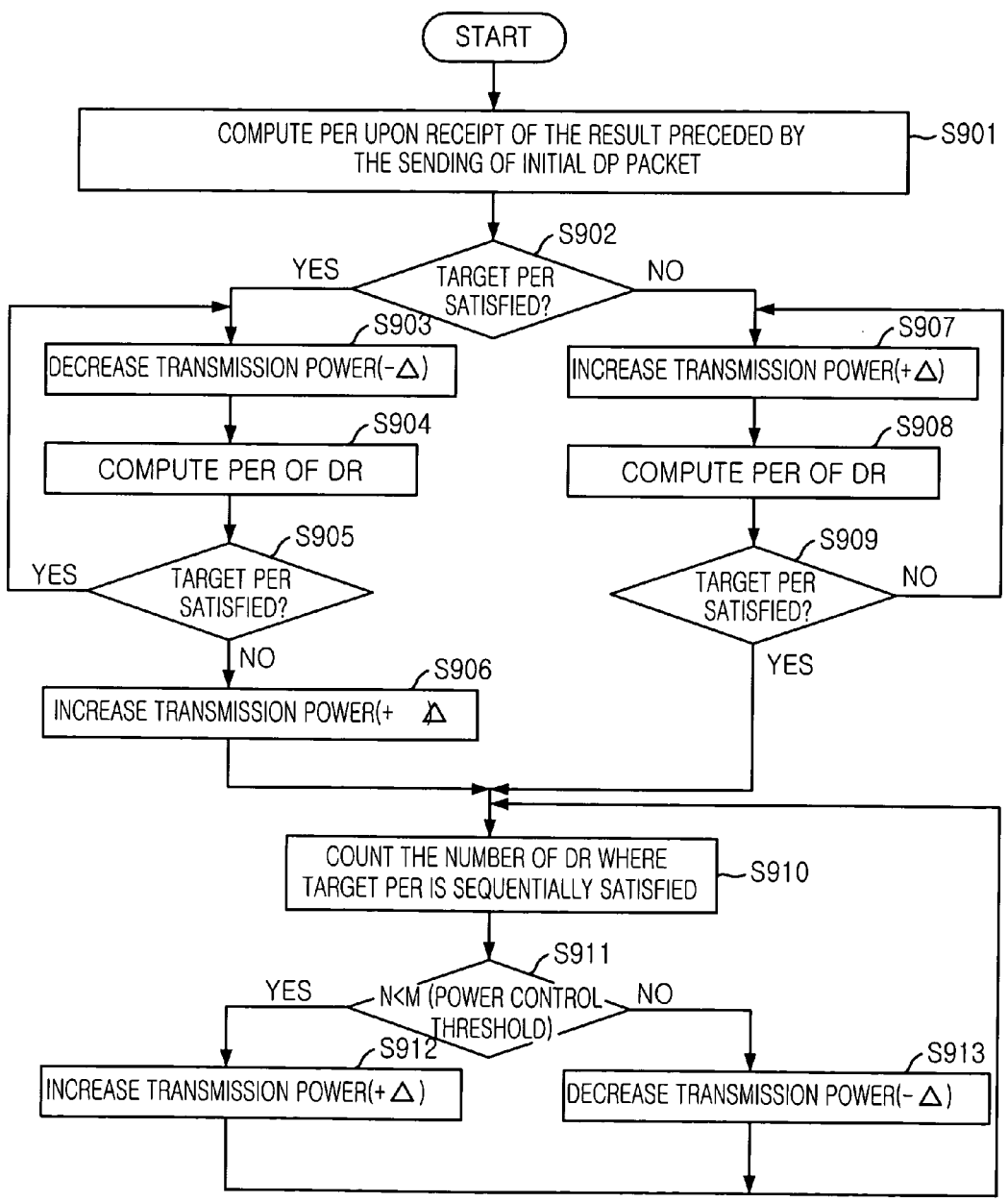
FIG. 9 is a flow chart illustrating a method for adjusting a power level, based on an 'Immediate Ack policy', based on a PER in a WPAN system in accordance with an embodiment of the present invention.

FIG. 9 is a flow chart illustrating a method for adjusting a power level, based on an 'Immediate Ack policy', based on a PER in a WPAN system in accordance with an embodiment of the present invention.

At step S901, the transmitter 50 sends out a packet of the initial DP based on the transmission power level set by the PNC. Then, it is determined whether the PER of the DP is computed based on the immediate response triggered by the transmission of the packet. At step S902, it is determined whether the PER of the initial DP satisfies the target PER. If the PER of the initial DP satisfies the target PER, the transmitter 50 decreases the transmission power level and sets an initial transmission power level (steps 903 to 906).

At step S903, if the PER of the initial DP satisfies the target PER, the transmission power level is decreased by one step size (−Δ). Next, at step S904, a PER of a next DP is computed. At step S905, it is determined whether the computed PER satisfies the target PER. The process repeats the steps S903 to S905 as long as the target PER is satisfied. If the target PER is not satisfied, the transmission power level is increased by one step size (Δ). The transmission power level at this point becomes a new initial transmission power level.

On the other hand, if the PER of the initial DP falls to satisfy the target PER at the step S902, the transmission power level is gradually increased, and set as a new initial transmission power level (steps 907 to 909).

In other words, at step S907, the transmission power level is increased by one step size (Δ) if the target PER is not satisfied. At step S908, the PER of the DP is computed. At step S909, it is determined whether the computed PER satisfies the target PER. The process repeats the steps S907 to S909 as long as the computed PER falls to satisfy the target PER. When the target PER is satisfied, the process moves on to step S910.

The process of setting the transmission power level (steps S901 to S909) is given in the foregoing discussion. From step S910 onwards, the process of adjusting the transmission power level is described in detail. In which case, any environmental change is factored in so as to maintain the best possible transmission power level.

At step S910, it is checked the number (N) of successive G, wherein B denotes DP satisfying the target PER. At step S911, it is determined whether the number (N) of successive G is smaller than a predetermined power control threshold (M), wherein B denotes DP satisfying the target PER. At step S912, the transmission power level is increased by one step size (Δ) to secure the quality of service (QoS) if the number of successive G (N) is smaller than the power control threshold (M). The process repeats the steps from S910 to S912.

On the other hand, at step S913, the transmission power level is decreased by one step size (Δ) if the number of successive G (N) is larger than the power control threshold (M). The process repeats the steps S910 to S913.

A program capable of implementing the power control method proposed by the present invention can be stored in a computer-readable medium such as a compact disk read only memory (CD-ROM), a random access memory (RAM), a hard disk and so on.

The method for adjusting the power level of transmission based on a packet error rate (PER) to secure quality of service (Qos) while minimizing power consumption as well as interference in a wireless personal area network (WPAN) system featuring fixed telecommunications and low-speed mobility.

While the present invention has been described with respect to certain preferred embodiments, it will be apparent to those skilled in the art that various changes and modifications may be made without departing from the scope of the invention as defined in the following claims.

What is claimed is:

1. A method for controlling a power level based on a packet error rate (PER) in a wireless personal area network (WPAN) system, the method comprising the steps of:
    a) at a receiver, computing a PER of a packet in an initial check duration of PER (DP) wherein a transmission power level of the packet is set by a piconet coordinator (PNC);
    b) at the receiver, determining whether the computed PER satisfies a target PER, adjusting a target signal-to-interference ratio (SIR) and requesting a transmitter to adjust the initial transmission power level; and
    c) at the receiver, determining whether the number (N) of successive G is larger than a power control threshold, wherein G denotes DP satisfying the target PER, changing the target SIR based on the determination result whether the number (N) of successive G is larger than the power control threshold, and requesting the transmitter to adjust the possible transmission power level.

2. The method as recited in claim 1, wherein said step b) includes the steps of:
    b1) at the receiver, determining whether the PER of the initial DP satisfies the target PER;
    b2) if the PER of the initial DP satisfies the target PER, decreasing the target SIR based on the PER of the received packet of the DP and forwarding a MLME-TX-POWER-CHANGE.req to the transmitter wherein the MLME-TX-POWER-CHANGE.req stands for a request for a change in the transmission power level, to thereby set an initial transmission power level; and
    b3) if the PER of the initial DP fails to satisfy the target PER, increasing the target SIR based on the PER of the packet of the DP and forwarding the message MLME-TX-POWER-CHANGE.req to the transmitter, to thereby set an initial transmission power level.

3. The method as recited in claim 2, wherein the step b2) includes the steps of:
    b2-a) at the receiver, forwarding to the transmitter the MLME-TX-POWER-CHANGE.req requesting to decrease the transmission power level by one step size (.DELTA.) at every DP, if the PER of the DP satisfies the target PER; and
    b2-b) at the receiver, forwarding to the transmitter the MLME-TX-POWER-CHANGE.req requesting to increase the transmission power level by one step size (.DELTA.), if the PER of the DP falls to satisfies the target PER, setting the transmission power level at this point as a new initial transmission power level.

4. The method as recited in claim 3, wherein the step b3) includes the steps of:
    b3-a) forwarding to the transmitter the MLME-TX-POWER-CHANGE.re- q requesting to increase the transmission power level by one step size (.DELTA.) at every DP, if the PER of the DP falls to satisfy the target PER; and
    b3-b) if the PER of the DP satisfies the target PER, setting the transmission power level at this point as a new initial transmission power level.

5. The method as recited in claim 1, wherein said step c) includes the steps of:
    c1) counting the number (N) of successive G, wherein G denotes DP satisfying the target PER;
    c2) determining whether the number (N) of successive G is larger than a certain power control threshold (M);
    c3) transmitting to the transmitter the MLME-TX-POWER-CHANGE.req requesting to increase the transmission power level, if the number (N) of successive G is smaller than the power control threshold (M); and
    c4) transmitting to the transmitter the MLME-TX-POWER-CHANGE.req requesting to decrease the transmission power level, if the number (N) of successive G is equal to or larger than the power control threshold (M).

6. A method for controlling a power level based on a packet error rate (PER) in a wireless personal area network (WPAN) system, the method comprising the steps of:
    a) at a transmitter, transmitting a packet in a check duration of the PER (DP), wherein a transmission power level is set by a piconet coordinator (PNC), and then computing the PER based on an immediate response (immediate Ack);
    b) at the transmitter, determining whether the computed PER of the packet satisfies a target PER, and adjusting the transmission power level, and setting an initial transmission power level; and
    c) at the transmitter, determining whether the number (N) of successive G is larger than a power control threshold (M), wherein G denotes DP satisfying the target PER, adjusting the transmission power level based on the determination result whether the number (N) of successive G is larger than a power control threshold (M), and optimizing the transmission power level.

7. The method as recited in claim 1, wherein said step b) includes the steps of:
    b1) at the transmitter, determining whether the computed PER satisfies the target PER;
    b2) setting the initial transmission power level by decreasing the target SIR based on the PER of the transmitted packet in the DP if the PER of the initial DP satisfies the target PER; and
    b3) setting the initial transmission power level by increasing the target SIR based on the PER of the transmitted packet in the DP if the PER of the initial DP falls to satisfy of the target PER.

8. The method as recited in claim 7, wherein the step b2) includes the steps of:
    b2-a) decreasing the transmission power level by one step size (.DELTA.) at every DP, if the PER of the initial DP satisfies the target PER; and
    b2-b) increasing the transmission power level, if the PER of the initial DP falls to satisfy the target PER, setting the transmission power level at this point as a new initial transmission power level.

9. The method as recited in claim 8, wherein step b3) includes the steps of:
    b3-a) decreasing the transmission power level by one step size (.DELTA.) at every DP, if the PER of the initial DP falls to satisfy the target PER; and
    b3-b) if the PER of the DP satisfies the target PER, setting the transmission power level at this point as a new initial transmission power level.

10. The method as recited in claim 6, wherein said step c) includes the steps of:
    c1) counting the number (N) of successive G, wherein G denotes DP satisfying the target PER;

c2) determining whether the number (N) of successive G is smaller than a certain power control threshold (M);

c3) increasing the transmission power level if the number (N) of successive G is smaller than the certain power control threshold (M); and c4) decreasing the transmission power level if the number (N) of successive G is equal to or greater than the certain power control threshold (M).

* * * * *